UNITED STATES PATENT OFFICE.

STEPHAN MATTAR, OF LEIPZIG, AND ROBERT FUNCKE, OF LORCH, GERMANY.

MANUFACTURING MEANS FROM WOOD-TAR FOR PREVENTING DUST ON STREETS, ROADS, AND THE LIKE.

No. 855,860.　　　Specification of Letters Patent.　　　Patented June 4, 1907.

Application filed September 1, 1906. Serial No. 333,030.

*To all whom it may concern:*

Be it known that we, STEPHAN MATTAR and ROBERT FUNCKE, subjects of the German Emperor, residing at Leipzig, Germany, (MATTAR,) and Lorch, Würtemberg, Germany, (FUNCKE,) have invented new and useful Improvements in Manufacturing Means from Wood-Tar for Preventing Dust on Streets, Roads, and the Like, of which the following is a specification.

The present invention has for its object a method of manufacturing means from wood-tar for preventing dust on streets, roads and the like.

Means for preventing inconveniences which are caused by dust on streets have already been variously proposed. It is particularly known to make such means of petroleum residues, mineral oils, or the like, as also to obtain them by mixing distilled coal-tar, namely coal-tar deprived of its more volatile constituents and of water, with various additional materials. Further, it is also known to employ such coal-tar mixtures deprived of their more volatile constituents in such a manner that they are sprinkled on the road concerned from a cart carrying a boiler provided with a heating device. Nevertheless the means proposed hitherto are by no means of the kind to meet all the requirements made of them. Especially the means for preventing dust made from the residue of petroleum proved from the first to be much too expensive, because the coat or sprinkling required too frequent renewal, quite apart from its absolutely not attaining the desired purpose. Coal-tar has a very penetrating smell for the dwellers in and users of the streets concerned. Also the upper surfaces of the streets treated with it do not attain sufficient hardness, so that the tar only exercises a more or less passing effect. The proposal to employ it after the distillation of its more volatile constituents in its heated state decidedly increased the expense of the method, and further had the defect that accidents could happen in consequence of burning or scalding, and, moreover, could not in any way remedy the disadvantages mentioned. We, on the contrary, have succeeded in making a means for preventing dust from wood-tar, which latter is a substance differing radically in its entire properties from coal-tar; said means satisfies the requirements indicated, and is of thoroughly enduring effect, as it is also insoluble in water and thus cannot be washed away by rain. It may also be pointed out that wood-tar, especially beech-wood tar, has hitherto been a material for which a profitable employment was wanting. Wood-tar has hitherto not been employed for the purpose in question, because it has a strong smell in its raw state, and because it was assumed from the first that this smell could be as little got rid of, by simply driving off the more volatile constituents, as that of coal-tar. We have nevertheless found that this is not the case and that a good means for preventing dust in streets may be made in this manner.

In accordance with the present invention all the more volatile constituents are in the first place for this purpose liberated from the wood-tar by heating it to about 200° C. In the first place the so-called first runnings which cause the usual smell of wood-tar are driven off, and secondly the water is removed which otherwise forms a preventive for the drying of the tar used for sprinkling the streets. Although the residue thus obtained could be used forthwith as means for the prevention of dust in streets, it is preferable to mix it with suitable additions which enhance its action. Accordingly the residual wood-tar is mixed with creosote oil or anthracene oil, or with both oils simultaneously. Preferably a mixture of one part by weight of wood-tar and two parts by weight of the oils mentioned (reckoned together) is employed; these proportions, however, may be more or less departed from. Instead of creosote oil and anthracene oil, moreover, other substances, which likewise have a sufficiently liquid consistency and act in a similar manner, may be used, namely petroleum distillates or vegetable oils which become resinous.

The means for preventing dust here described may be applied to the surface of the roads in any desired suitable manner, for example by pouring by means of watering cans, by sprinkling by means of suitably constructed watering carts, by spraying by means of mechanical or compressed-air sprayers, or the like.

The advantages of the new method consist in its supplying means which may be applied cold and which completely harden after a short time, but which remain elastic. Moreover it makes impervious the upper surface of the street and powerfully resists the action of the weather for a long time. Therefore the means according to the present invention actually make the roads firmer, contrary to those used hitherto which were made from petroleum and coal-tar. Lastly, the employment of wood-tar is in itself of great economic advantage, as already indicated.

What we claim as our invention and desire to secure by Letters Patent is:

1. A method of manufacturing means for the prevention of dust, consisting in heating wood-tar to about 200° C, and driving off the more volatile constituents, and in adding less volatile products of the dry distillation of natural carbon compounds, substantially as described.

2. A method of manufacturing means for the prevention of dust, consisting in heating wood-tar to about 200° C. and driving off the more volatile constituents, and adding creosote oil, substantially as described.

3. A method of manufacturing means for the prevention of dust, consisting in heating wood-tar to about 200° C. and driving off the more volatile constituents, and adding anthracene oil, substantially as described.

4. A method of manufacturing means for the prevention of dust, consisting in heating wood-tar to about 200° C. and driving off the more volatile constituents, and adding creosote oil and anthracene oil, substantially as described.

5. A method of manufacturing means for the prevention of dust, consisting in heating wood-tar to about 200° C. and driving off the more volatile constituents, and adding distillates of petroleum, substantially as described.

In testimony whereof we have signed our names to this specification in the presence of two subscribing witnesses.

STEPHAN MATTAR.
ROBERT FUNCKE.

Witnesses as to Stephan Mattar:
 CURT VIEHRIG,
 RUDOLPH FRICKE.
Witnesses as to R. Funcke:
 WM. HAHN,
 ERNST ENTENMANN.